(12) United States Patent
Morita

(10) Patent No.: US 8,837,005 B2
(45) Date of Patent: Sep. 16, 2014

(54) DATA TRANSMISSION APPARATUS, CONTROL METHOD THEREFOR, AND STORAGE MEDIUM

(71) Applicant: Canon Kabushiki Kaisha, Tokyo (JP)

(72) Inventor: Hiroyasu Morita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 13/760,481

(22) Filed: Feb. 6, 2013

(65) Prior Publication Data

US 2013/0201529 A1  Aug. 8, 2013

(30) Foreign Application Priority Data

Feb. 8, 2012  (JP) ................. 2012-025335

(51) Int. Cl.
*H04N 1/00* (2006.01)
*H04N 1/32* (2006.01)

(52) U.S. Cl.
CPC .... *H04N 1/00352* (2013.01); *H04N 2201/3202* (2013.01); *H04N 1/00517* (2013.01); *H04N 1/00482* (2013.01); *H04N 2201/33364* (2013.01); *H04N 1/00411* (2013.01); *H04N 2201/3273* (2013.01); *H04N 1/32122* (2013.01); *H04N 2201/0094* (2013.01); *H04N 1/00408* (2013.01)

USPC .......... 358/402; 358/1.13; 358/1.15

(58) Field of Classification Search
None
See application file for complete search history.

(56) References Cited

U.S. PATENT DOCUMENTS

| | | | |
|---|---|---|---|
| 6,862,104 B2 * | 3/2005 | Yajima et al. | 358/1.15 |
| 2001/0022665 A1 * | 9/2001 | Yajima et al. | 358/1.13 |
| 2005/0223324 A1 * | 10/2005 | Tashiro | 715/527 |
| 2006/0239245 A1 * | 10/2006 | Van Hoof | 370/352 |
| 2009/0198838 A1 * | 8/2009 | Murata et al. | 710/8 |
| 2012/0057205 A1 * | 3/2012 | Tashiro | 358/1.15 |

FOREIGN PATENT DOCUMENTS

JP   2006-135570 A   5/2006

* cited by examiner

*Primary Examiner* — Kimberly A Williams
(74) *Attorney, Agent, or Firm* — Canon USA Inc IP Division

(57) ABSTRACT

A data transmission apparatus configured to determine an operation screen to be shifted to from a history screen, with reference to a protocol type read from a transmission history selected on the history screen, an application ID when the transmission is performed, a setting value relating to the operation screen, information about the operation screen that has been displayed before shifting to the history screen, and information about an address that has been already set on the operation screen that has been displayed before the history screen is displayed.

8 Claims, 11 Drawing Sheets

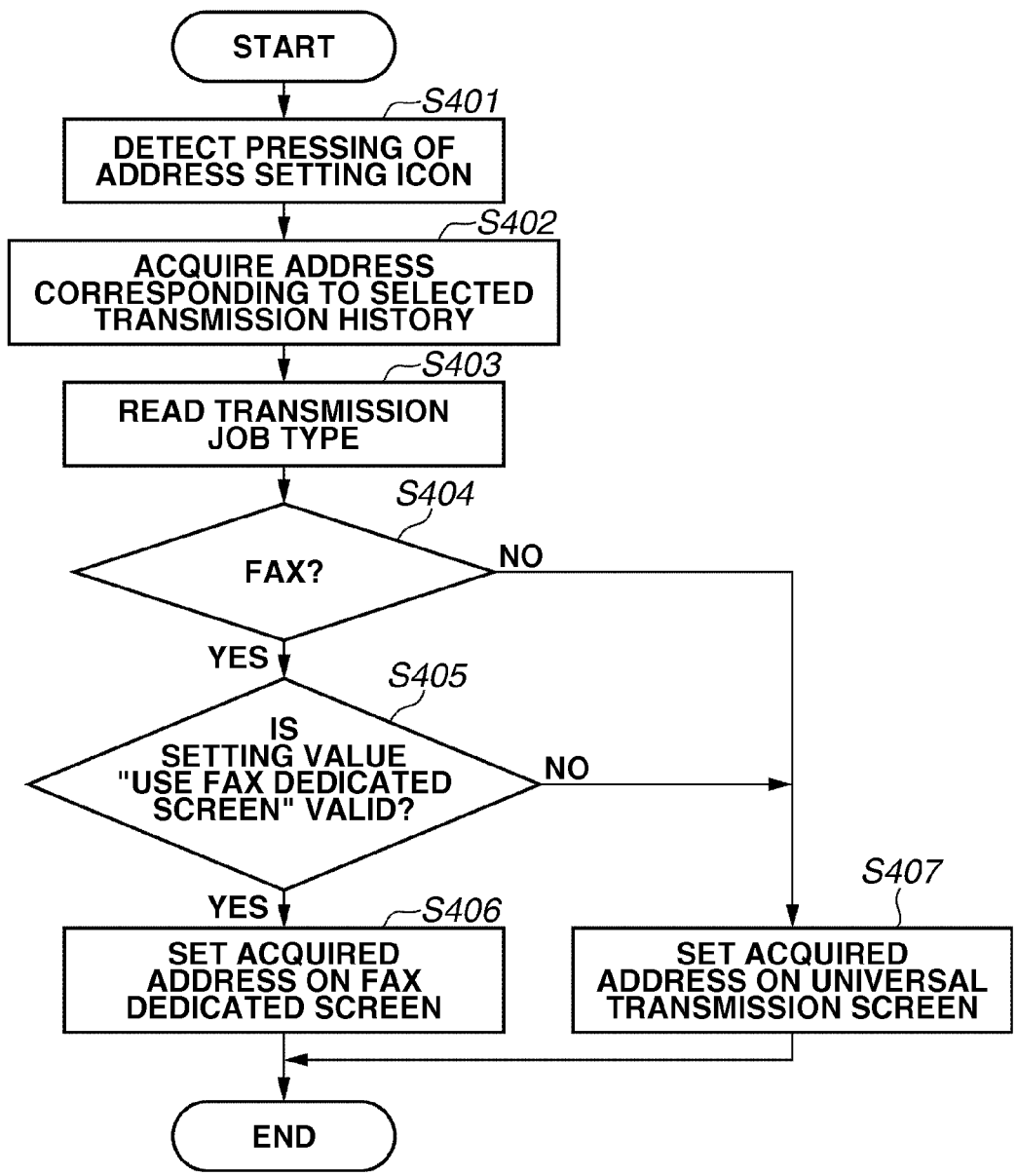

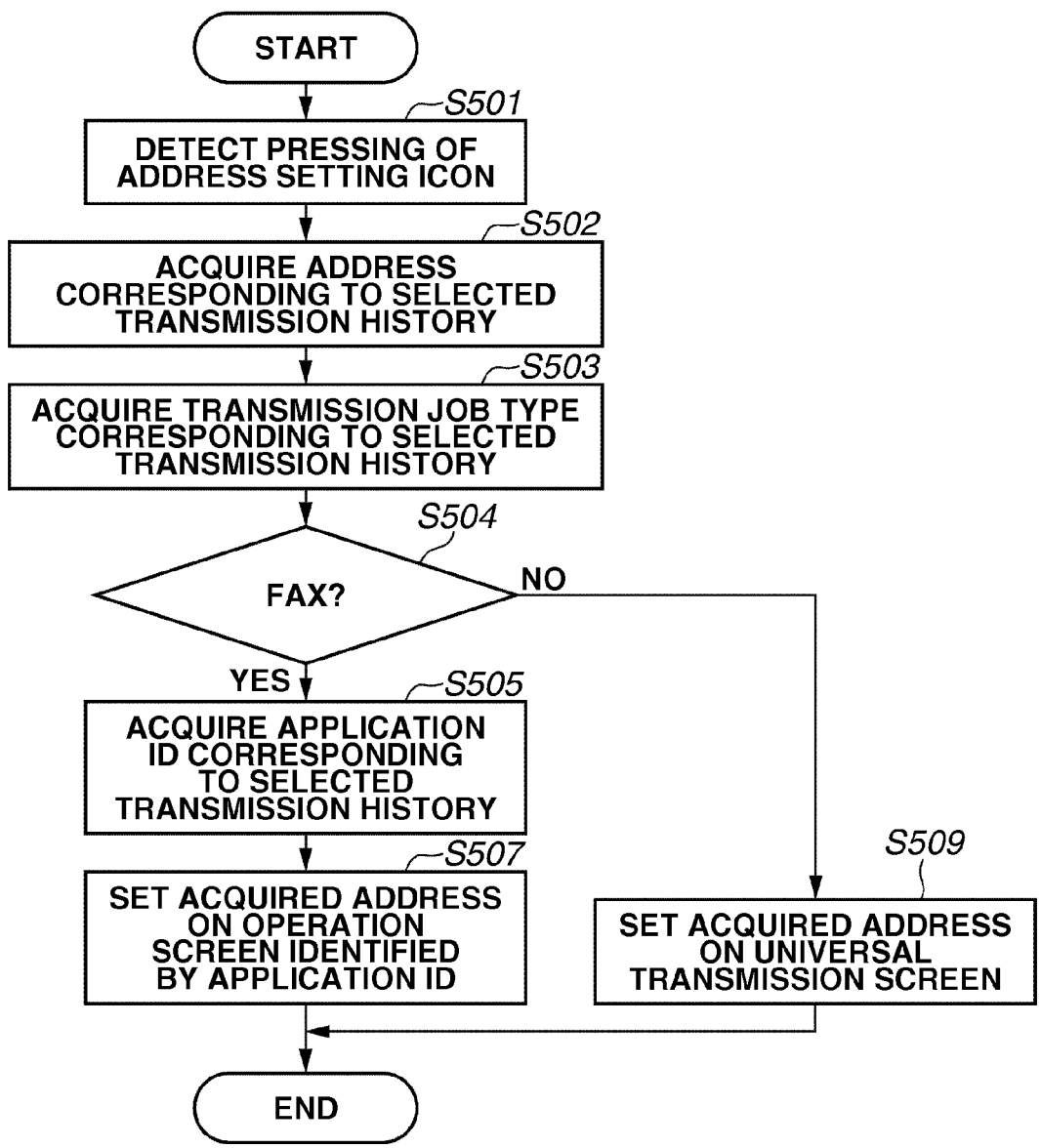

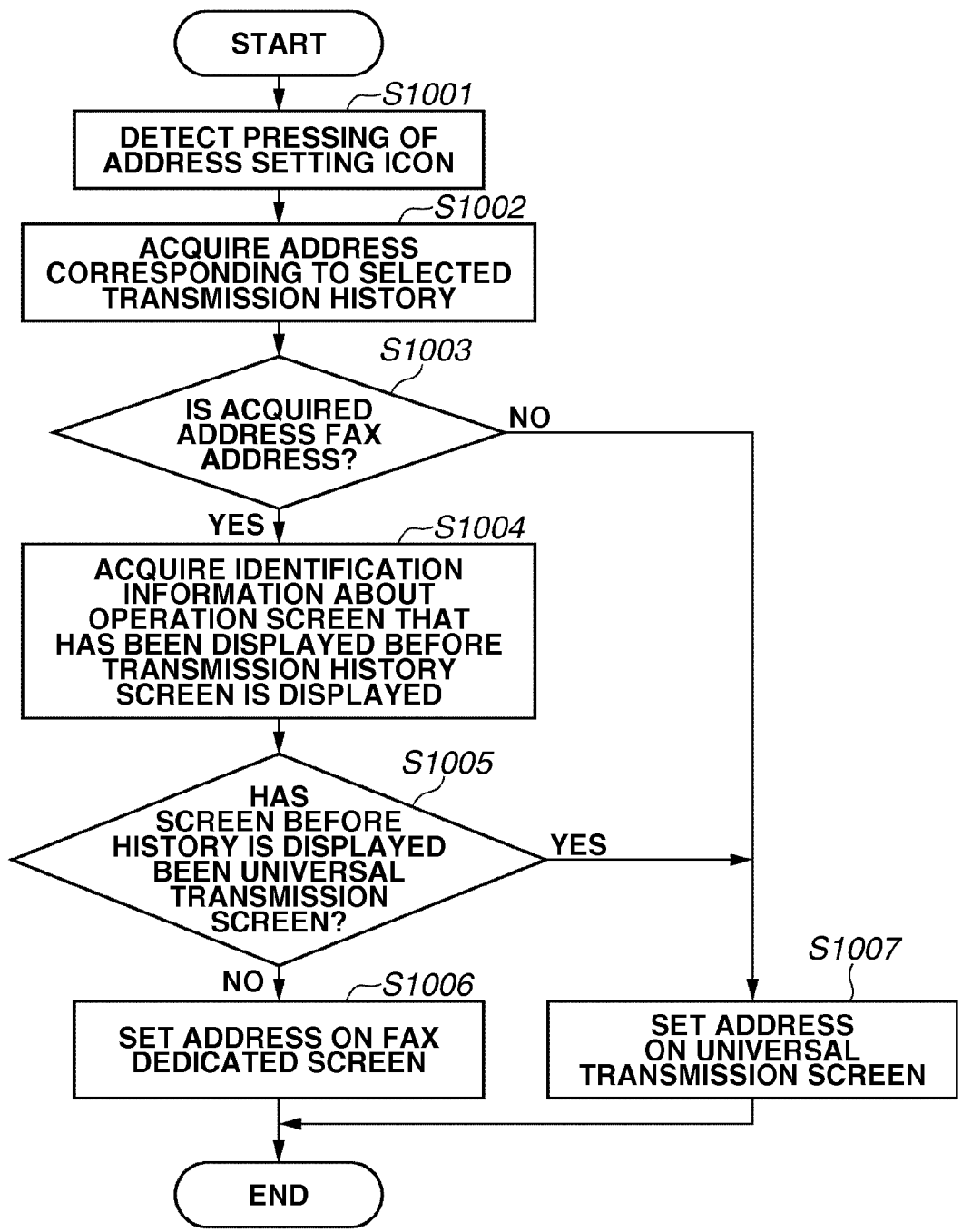

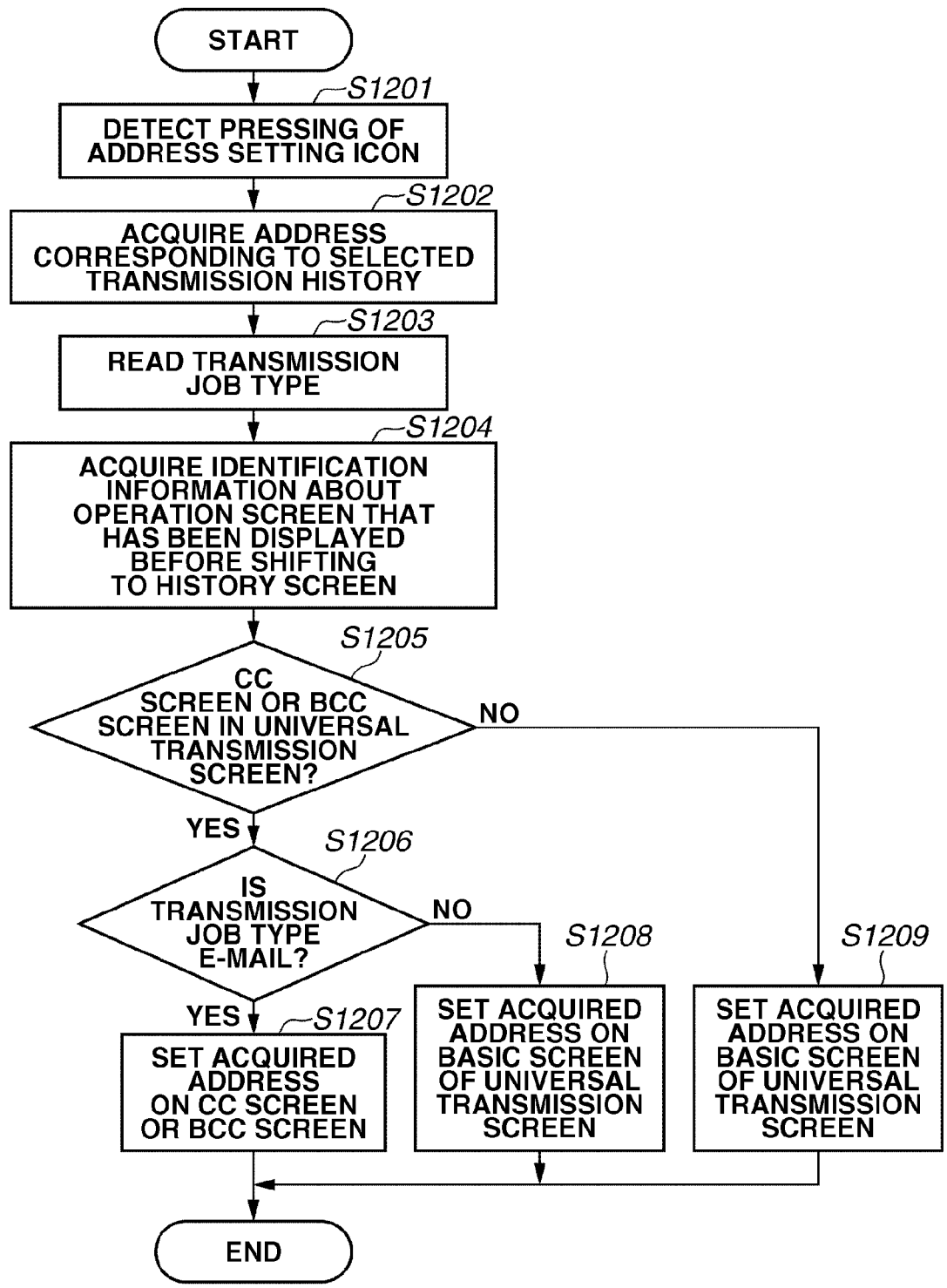

DATA TRANSMISSION APPARATUS, CONTROL METHOD THEREFOR, AND STORAGE MEDIUM

BACKGROUND OF THE INVENTION

1. Field of the Invention

The present invention relates to a data transmission apparatus for transmitting image data to a designated address via a network or a pubic line.

2. Description of the Related Art

In recent years, digital multifunction peripherals (MFPs) capable of performing a transmission function in addition to a copy function and a print function have been widely used. Such digital MFPs include an operation unit integrally provided with a hardware key and an operation panel having a touch screen function, and thus a user can select a desired function from a list of functions displayed on the operation panel to perform a desired processing.

The transmission function is a function for converting read image data or image data stored in the apparatus, and then transmitting the converted data to a specified address via a network or a public line. When the data is transmitted via the public line, a facsimile (fax) number is set, and when the data is transmitted via the network, a transmission protocol used for transmission and a transmission address corresponding to the transmission protocol are set. Various types of methods of setting the transmission address are provided such as a method of setting the transmission address by selecting the address from the address book previously registered in the digital MFP, and a method input directly by a user via the hardware key on the operation panel when the transmission is performed.

Japanese Patent Application Laid-Open No. 2006-135570 discusses a method of setting a new transmission address by displaying addresses to which a login user has performed transmission processing in the past from a terminal apparatus and, from among the addresses, specifying the address to be used.

Various types of transmission functions can be set when data is transmitted. Therefore, it is desired that a user can more simply operate settings. To satisfy such a request, for example, the digital MFPs that separately include an operation screen for transmitting the data via the public line and the operation screen for transmitting the data via the network have been already provided.

Such digital MFPs display an operation screen on which only fax transmission can be set when the fax transmission is performed, and an operation screen on which only network transmission can be set when the data transmission is performed via the network.

On the other hand, for example, there is a desire for transmitting the fax and an e-mail simultaneously. To satisfy such a request, an operation screen needs to be prepared on which both a fax number and an e-mail address can be set at a time.

As discussed in Japanese Patent Application Laid-Open No. 2006-135570, as a method of setting a transmission address of data on an operation screen, there is a method of setting the transmission address on the operation screen by displaying addresses to which the user has performed the transmission processing in the past as a transmission history and, from among the transmission history, specifying an address.

However, when the transmission address is to be set on the operation screen by specifying the address from the job transmission history, if a plurality of operation screens is provided, it is not uniquely determined on which operation screen the setting is to be performed.

For example, a fax number of the job transmission history that has been transmitted in the past by a facsimile machine is set on the operation screen as a new transmission address. The apparatus is provided with an operation screen on which only a fax transmission can be set and an operation screen on which both the fax and network transmissions can be set.

In this case, when the fax number is set on the operation screen on which only the fax transmission can be set, since the screen displays only the setting items unique to the fax transmission, the user can perform the setting operation more easily. On the other hand, for example, the method described above cannot satisfy the request for simultaneously performing a fax transmission and an e-mail transmission.

Further, when the setting is performed on the operation screen on which both the fax and network transmissions can be set, the fax numbers in the transmission history of the jobs that have been transmitted by the facsimile machine in the past can be set on the operation screen, and also the e-mail address can be selected from the address book to be set on the screen, and thus the fax transmission and the e-mail transmission for the same information can be simultaneously performed.

However, on the other hand, for users who do not desire the usage described above, since unnecessary setting items are displayed on the screen, the setting operation becomes complicated.

SUMMARY OF THE INVENTION

The present invention is directed to a data transmission apparatus capable of setting an address by determining an optimum operation screen from among a plurality of operation screens.

According to an aspect of the present invention, a data transmission apparatus includes: an input unit configured to input data; an operation screen display unit configured to display a fax screen for performing fax transmission and a transmission screen for performing the fax transmission and network transmission; a history display unit configured to display history of transmissions performed in past; an acquisition unit configured to acquire an address and a transmission type corresponding to history selected from the history; a setting unit configured to, when the transmission type is fax and when use of the fax screen is limited, set the address acquired by the acquisition unit for a transmission screen, and when the transmission type is the fax and when the use of the fax screen is not limited, set an address corresponding to the selected history for the fax screen; and a fax transmission unit configured to transmit the data input to the address set by the setting unit via a public line.

According to the present invention, when a user specifies address setting from a transmission history, an appropriate operation screen can be selected to set an address from among a plurality of operation screens provided by the apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a flowchart illustrating processing for selecting a transmission history from the history screen and setting an address corresponding to the selected transmission history on an operation screen.

FIG. 7 is a flowchart illustrating processing for selecting a transmission history from a history screen and setting an address corresponding to the selected transmission history on an operation screen according to a second exemplary embodiment of the present invention.

FIG. 8 is a flowchart illustrating processing for selecting a transmission history from a history screen and setting an address corresponding to the selected transmission history on an operation screen according to a third exemplary embodiment of the present invention.

FIG. 11 is a flowchart illustrating processing for reading address information from a transmission history and setting the address information as a transmission address while Cc/Bcc is being input according to a fifth exemplary embodiment of the present invention.

DESCRIPTION OF THE EMBODIMENTS

Various exemplary embodiments, features, and aspects of the invention will be described in detail below with reference to the drawings.

Figure 1:
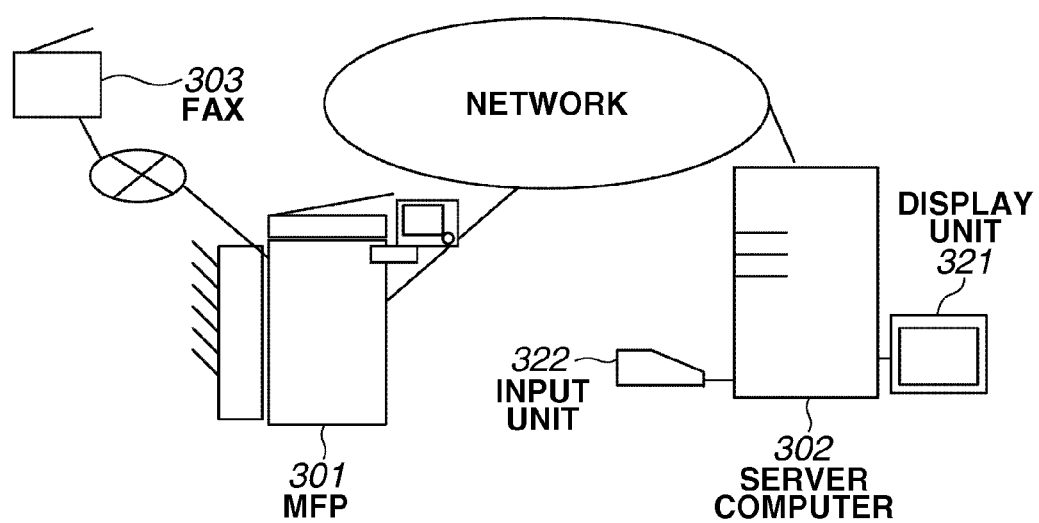
FIG. 1 illustrates a system to which an exemplary embodiment of the present invention is applied.

FIG. 1 illustrates a system to which an exemplary embodiment is applied. As illustrated in FIG. 1, a digital MFP (hereinafter, simply referred to as an "MFP") 301 is an example of a data transmission apparatus that scans a document and transmits image data. A display unit 321 and an input unit 322 are connected to a server computer 302. The MFP 301 and the server computer 302 are each connected to a network via a network interface. Further, the MFP 301 is connected to a fax 303 via a public line.

Figure 2:
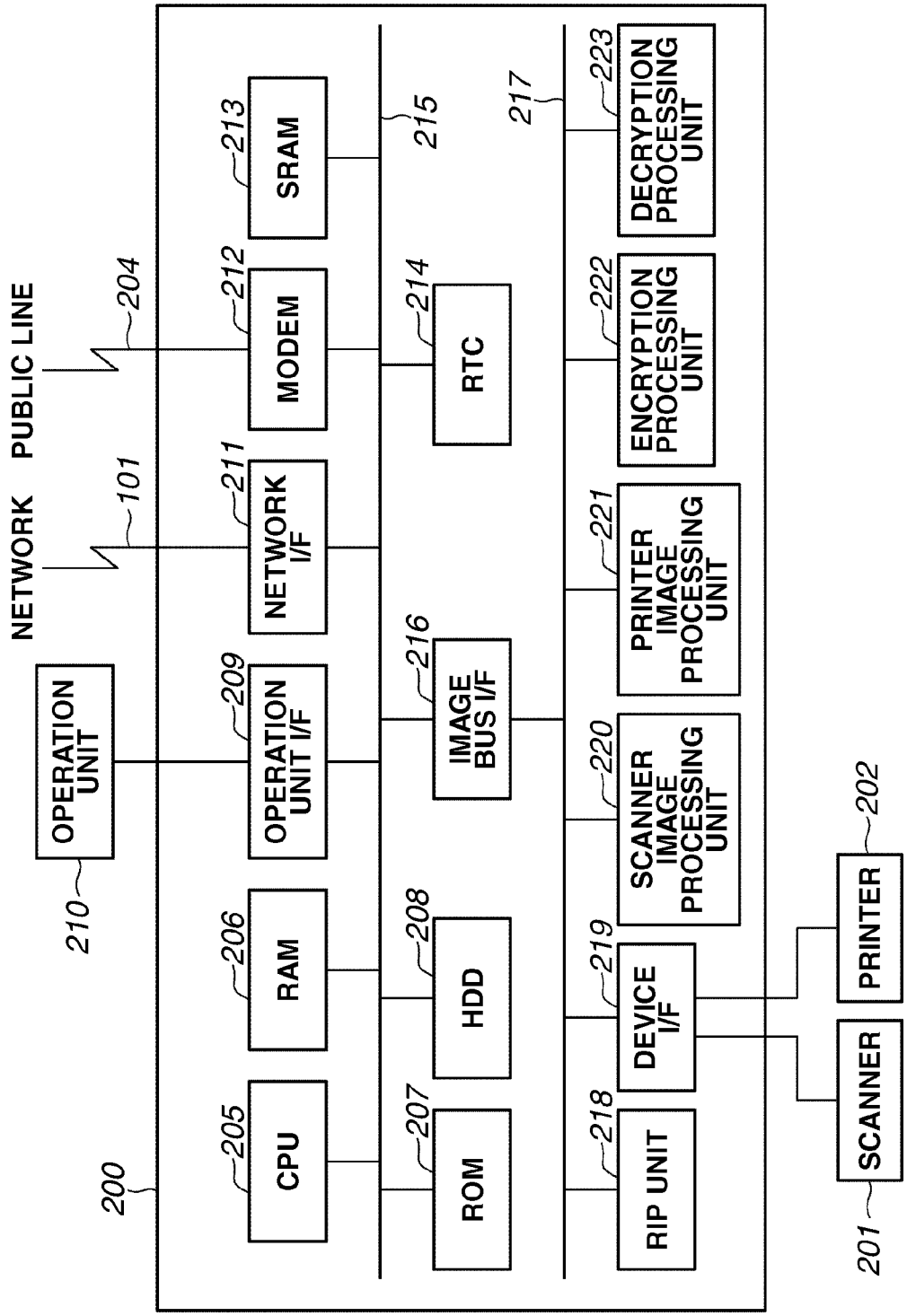
FIG. 2 is a block diagram illustrating a schematic configuration of a digital MFP as an example of a data transmission apparatus.

FIG. 2 is a block diagram illustrating a schematic configuration of the MFP 301 according to the present exemplary embodiment. A control unit 200 is connected to a scanner 201 that is an image input device and a printer 202 that is an image output device. Further, the control unit 200 is connected to the network 101 and the public line 204 to input/output image information and device information.

A central processing unit (CPU) 205 is a processor for controlling the entire MFP 301. A random access memory (RAM) 206 is a system work memory for operating the CPU 205 and also an image memory temporary for storing the image data. A read only memory (ROM) 207 is a boot ROM and stores a boot program of the system.

A hard disk drive (HDD) 208 stores system software, applications, and image data. Further, the HDD 208 also stores a program for executing the flowcharts illustrated in FIGS. 6 to 9, and 11 described below.

Each step of the flowcharts illustrated in FIGS. 6 to 9, and 11 is performed by the program stored in the HDD 208 by the CPU 205. However, a processor other than the CPU 205 may execute each step of the above-described flowchart, or the CPU 205 and other processors may execute the processing of the above-described flowcharts in corporation.

An operation unit interface 209 is an interface part with an operation unit 210 including a touch panel, and outputs image data to be displayed on the operation unit 210 to the operation unit 210. Further, the operation unit interface 209 transmits information input by a user of this system from the operation unit 210 to the CPU 205.

A network interface 211 is connected to the network 101, to input/output information. A modem 212 is connected to the public line 204 to input/output information. A static RAM (SRAM) 213 is a non-volatile recording medium capable of operating at high speed.

A real time clock (RTC) 214 performs processing for continuing counting current time even when a power of a control unit 200 is not turned on. Devices described above are arranged on a system bus 215.

An image bus interface (I/F) 216 is a bus bridge for connecting the system bus 215 to an image bus 217 for transferring the image data at high speed, and converting a data structure. The image bus 217 is configured by a Peripheral Component Interconnect (PCI) bus or Institute of Electrical and Electronics Engineers (IEEE) 1394. On the image bus 217, devices described below are arranged.

A raster image processor (RIP) unit 218 rasterizes a page description language (PDL) code into a bit map image. A device interface (I/F) 219 connects the scanner 201, the printer 202, and the control unit 200, which are image input/output devices, to perform synchronous/asynchronous conversion on the image data.

A scanner image processing unit 220 performs correction, processing, and edition on input image data. A printer image processing unit 221 performs print correction and resolution conversion on print output image data. An encryption processing unit 222 performs encryption processing on the input data including the image data. A decryption processing unit 223 performs decryption processing on the encryption data.

Figure 3:
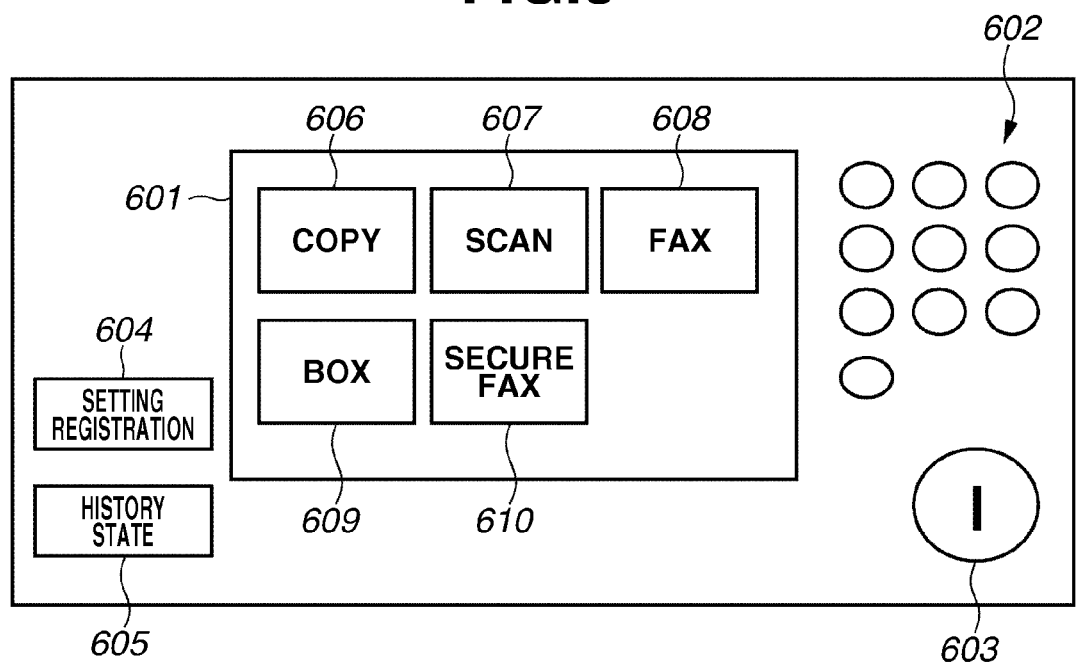
FIG. 3 illustrates an example of a home screen displayed on an operation unit.

FIG. 3 illustrates an example of a home screen (also referred to as a "menu screen") displayed on the operation unit 210 when the MFP 301 is activated. As illustrated in FIG. 3, a screen 601 displays icons used for selecting an application. When the user selects a desired icon from among icons for copy 606, scan 607, fax 608, box 609, and secure fax 610 displayed on the screen 601, the corresponding application is activated, and then the screen is shifted to a predetermined operation screen.

More specifically, in response to the selection of the copy icon 606, a copy application providing a copy function is activated to display the operation screen used for the copy application for performing copy processing.

Further, in response to the selection of the scan icon 607, an application providing a network scanning function is activated to display a universal transmission screen illustrated in FIG. 4A described below.

According to the present exemplary embodiment, the application activated when the scan icon 607 is selected can transmit the same information by different types of transmission jobs, in other words, can perform different types of transmissions for the same information. The transmission job types include e-mail transmission, server message block (SMB) transmission, file transfer protocol (FTP) transmission, web-based distributed authoring and versioning (Web-DAV) transmission, fax transmission, and internet and fax transmission. When a transmission operation is performed on the universal transmission screen, two or more transmission job types can be appropriately combined with one another from among the transmission job types described above, and then the same information can be transmitted.

The internet and fax transmission herein performs data transmission using a protocol for the e-mail (simple mail transfer protocol (SMTP)) in place of a telephone line, and is recommended by an international telecommunication union (ITU).

When the transmission function is used using the universal transmission screen, the apparatus can respond to a wide variety of user's needs. For example, the different types of transmission for the same information can be performed via the fax transmissions and the e-mail transmission with one transmission instruction.

Further, in response to selection of the fax icon 608, an application providing a fax function is activated to display a fax dedicated screen illustrated in FIG. 4B described below.

According to the present exemplary embodiment, the application activated when the fax icon 608 is selected is different from the application (application corresponding to the scan icon 607) displaying the universal transmission screen, and deals with only the fax transmission to simplify the user's operation.

In other words, since setting that has nothing to do with the fax transmission is not displayed on the fax dedicated screen, the fax transmission can be performed by a user-friendly operation. However, this application cannot perform the different types of transmissions for the same information described above.

Further, in response to the selection of the box icon 609, an application providing a box function is activated to display an operation screen for the box function. The box function stores in the HDD 208 data input from the scanner 201 or an external terminal and performs printing, edition, and transmission of the data stored therein. In the present exemplary embodiment, the box function is not described in detail.

Further, in response to the selection of a secure fax icon 610, the secure fax application is invoked to display a screen for secure fax. The secure fax application can collect log of the fax transmissions and manage by whom, when, and how the image is transmitted. The secure fax application is executed in an execution environment of Java (registered trademark). The execution environment of Java (registered trademark) can be realized by a virtual machine operating on a real time operating system (OS).

Further, on the operation unit 210, a ten-key 602 and a start key 603 for instructing the apparatus to start copy or data transmission are arranged. Further, a setting/registration screen invoking key 604 for invoking a setting screen for changing various types of setting values of the MFP 301 and a history key 605 for invoking a screen displaying job history and a job state are arranged.

When the setting/registration screen invoking key 604 is selected, a setting screen (not illustrated) for performing various types of settings of the MFP 301 is displayed. Via the setting screen, the settings of the MFP 301 can be performed. The set value is stored in the HDD 208.

Particularly in the present exemplary embodiment, as an example of the setting value, a value indicating whether to use the fax dedicated screen is stored in the HDD 208. When the setting value of "use fax dedicated screen" is valid, the fax transmission using the fax dedicated screen illustrated in FIG. 4B described below can be performed.

On the other hand, when the setting value of "use fax dedicated screen" is invalid, the fax icon 608 is not displayed, and use of the fax dedicated screen is limited. However, even when this setting value is invalid, the user operation is limited only on the fax dedicated screen, the fax transmission itself is not prohibited. In other words, even if the setting value is invalid, the fax transmission can be performed by the user's operation on the universal transmission screen described below.

When the setting value of "use fax dedicated screen" is valid, the setting can be further performed for indicating whether to "display fax on universal transmission screen". When the setting value of "use fax dedicated screen" is valid, and also when the setting value of "display fax on universal transmission screen" is valid, the operation can be performed on the fax dedicated screen, or the operation for the fax transmission can be also performed on the universal transmission screen. In other words, when the user performs the fax transmission, two types of options can be provided.

On the other hand, when, although the setting value of "use fax dedicated screen" is valid, the setting value of "display fax on universal transmission screen" is invalid, the operation on the fax dedicated screen can be performed, however, the operation for the fax transmission on the universal transmission screen is limited.

Figure 4A:
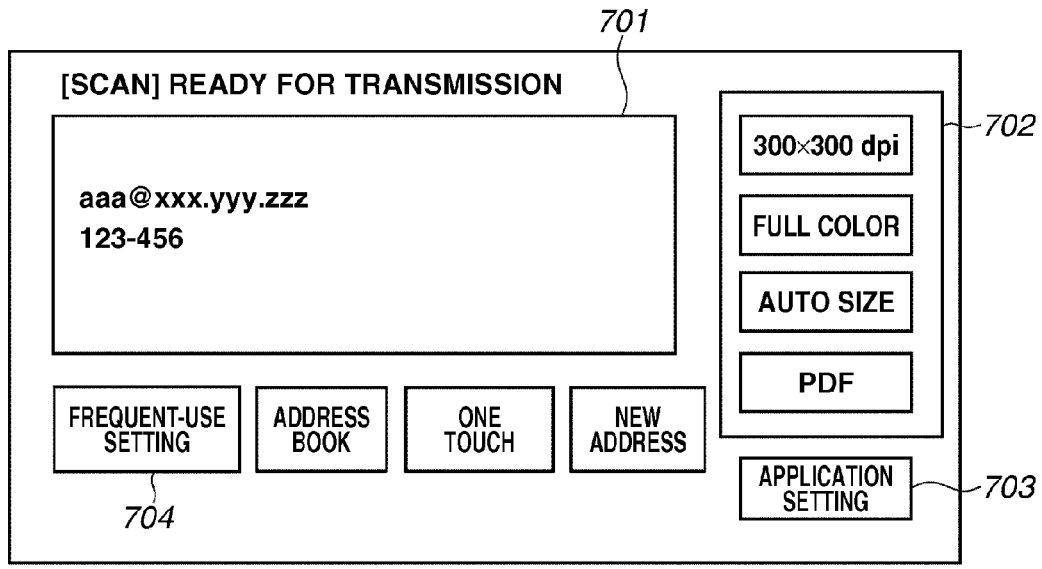
FIG. 4A illustrates an example of a universal transmission screen on which transmission addresses of a plurality of types of transmission jobs can be set when data is transmitted.

FIG. 4A is an example illustrating a screen (hereinafter, referred to as a "universal transmission screen") displayed on the operation unit 210 when the user presses the scan icon 607. On the universal transmission screen illustrated in FIG. 4A, an address input screen 701 on which a transmission address can be set is displayed.

There are several methods of setting the transmission address, for example, a setting method using the address book, a one-touch button, and the ten-key 602. By those methods, the addresses that correspond to various types of transmission protocols and are used as transmission addresses of the data such as the e-mail address, a folder path of a file server, and a fax number can be set on the operation screen.

A transmission setting icon 702 is an icon used to set a reading resolution and a reading color mode. An application setting icon 703 is an icon used when more details than set by the transmission setting 702 are set. Further, a frequent-use setting icon 704 used to invoke the transmission setting stored in the HDD 208 is displayed.

On the universal transmission screen illustrated in FIG. 4A, at least in the present exemplary embodiment, the e-mail transmission, the SMB transmission, the FTP transmission, the WebDAV transmission, and the internet and fax transmission can be performed. Further, depending on the setting of the MFP 301, in other words, when the setting value of "use fax dedicated screen" described above is invalid, further the fax transmission can be performed.

Further, when the setting value of "use fax dedicated screen" is invalid, and also when the setting value of "display fax on universal transmission screen" is valid, the fax transmission can be performed on the universal transmission screen. When the fax transmission can be selected on the universal transmission screen, the setting unique to the fax can be performed on the universal transmission screen.

Figure 4B:
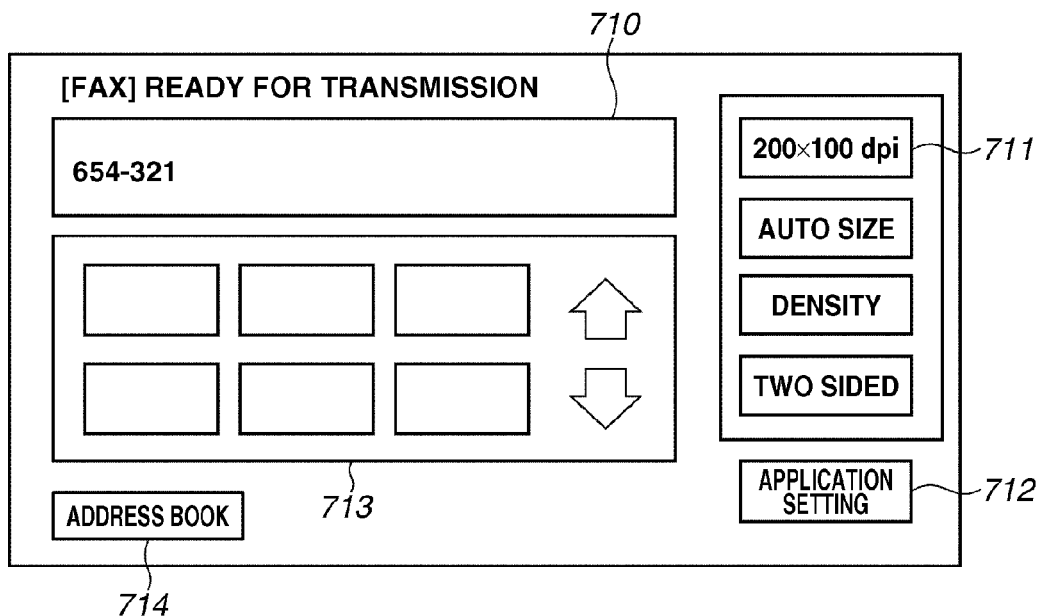
FIG. 4B illustrates an example of a fax dedicated screen on which only an address for fax transmission can be set.

FIG. 4B is an example illustrating the operation screen dedicated for the fax (fax dedicated screen) displayed on the operation unit 210 when the user presses the fax icon 608. On the fax dedicated screen illustrated in FIG. 4B, a fax address display region 710 displaying the fax transmission address specified by the user is displayed.

A transmission setting icon 711 is used to set transmission setting including the reading resolution and a reading size. An application setting icon 712 is used to invoke various types of detailed settings when reading and transmission are performed. Further, a one-touch button 713 stores the fax address and an address-book invoking icon 714 is used to invoke the address book. As described above, the fax dedicated screen illustrated in FIG. 4B can be used only for the fax transmission.

Figure 5A:
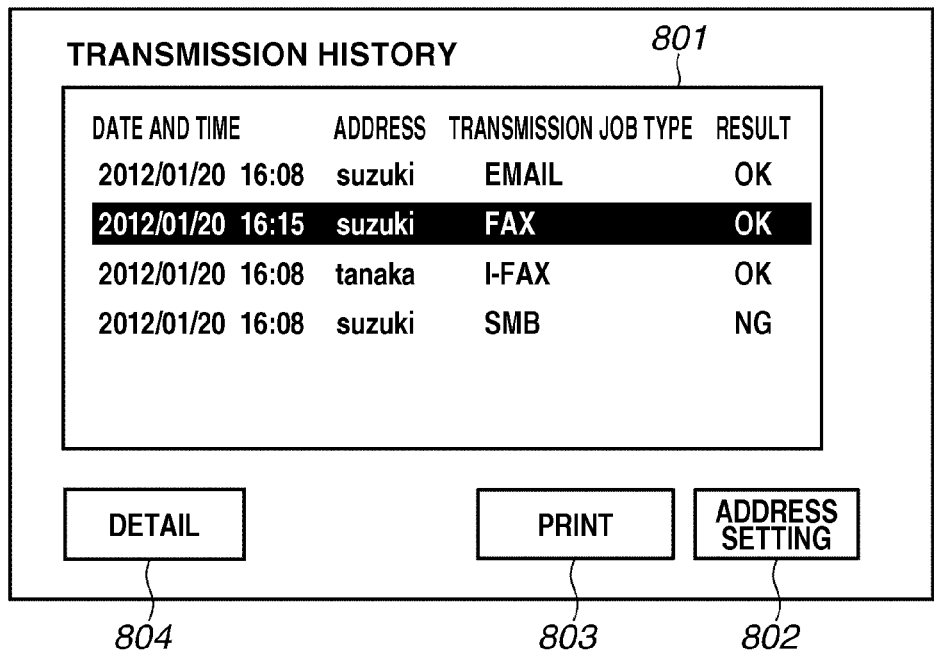
FIG. 5A illustrates an example of a history screen displayed on the operation unit.

FIG. 5A is an example illustrating a history screen displayed on the operation unit 210. The history screen is displayed when the user presses the history key 605 of the operation unit 210. On the screen illustrated in FIG. 5A, a transmission history list 801 displays the transmission history.

The transmission history list 801 displays transmission jobs corresponding to various types of transmission jobs in a list. In other words, many types of jobs are included, for example, the fax-transmitted job, the email-transmitted job, the SMB-transmitted job, and the internet and fax transmitted job.

According to the present exemplary embodiment, the different types of transmissions for the same information by a plurality of transmission job types are managed as separated jobs for each transmission type.

An address setting icon 802 is used to set the address from the history screen when the user gives an instruction for re-using the transmission address of the transmission history selected from the transmission history list 801. When the address setting icon 802 is pressed in a state where a specific job history is selected in the transmission history list 801 illustrated in FIG. 5A, the screen shifts to either of the operation screens illustrated in FIGS. 4A and 4B.

Further, the address corresponding to the transmission history selected from the transmission history list is set on the operation screen after shift (either of operation screens illustrated in FIGS. 4A and 4B) as the transmission address of the data. Since whether to shift to the screen illustrated in FIG. 4A or FIG. 4B is a characteristic part of the present exemplary embodiment, details will be described below with reference to a flowchart illustrated in FIG. 6 below.

A transmission history list print icon 803 is used to give an instruction for printing the transmission history list. A detailed information display icon 804 is used to display detailed information about the history selected by the user from the transmission history list.

Figure 5B:
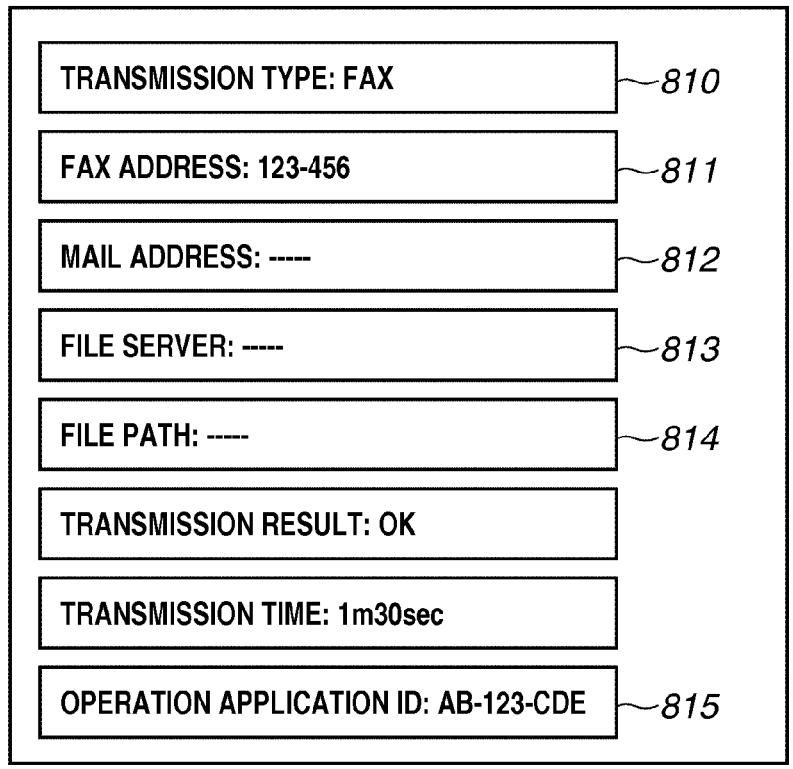
FIG. 5B is an example of transmission history information stored in a memory after a transmission job is performed.

FIG. 5B illustrates an example of the history information stored in a job history region of the HDD 208 after the transmission job is performed by the user's operation.

A transmission job type 810 is information indicating a type of the transmission job. According to the example of the transmission history information illustrated in FIG. 5B, a value of "fax" indicating the fax transmission is stored.

As another example, when the e-mail transmission is performed, the value of "E-mail" is stored, and when the SMB transmission is performed, the value of "SMB" is stored. Further, when the FTP transmission is performed, the value of "FTP" is stored, and when the WebDAV transmission is performed, the value of "WebDAV" is stored. Further, when the internet and fax transmission is performed, the value of "I-FAX" is stored.

When the different types of transmissions for the same information are performed, the data transmissions in the plurality of transmission job types are performed with one user's transmission instruction. However, each transmission in the plurality of transmission job types is actually performed as an individual job. And, a job ID is given to each job. For each job ID, the transmission information is stored in the HDD 208 as separate history information.

For example, when the different types of transmissions for the same information by the fax transmission and the e-mail transmission are performed, the transmission history information about the fax transmission and the transmission history information about the e-mail transmission are individually stored in the HDD 208. However, the present exemplary embodiment described above is merely an example, and the plurality of transmission job types may be stored in the transmission job type 810. For example, when the fax transmission and the e-mail transmission for the same information are performed, both the "fax" and the "E-mail" may be stored in the transmission job type 810.

A fax address 811 is a region indicating a transmitted fax address number, and according to this example, the fax address 811 indicates 123-456.

A mail address 812, a file server 813, and a file path 814 are regions respectively storing a mail transmission address, a transmission file server, and path information about a file server. According to this example, since the history indicates the fax transmission, all of the mail address 812, the file server 813, and the file path 814 indicate to be invalid.

When the value indicating the e-mail is stored in the transmission job type 810, the mail address 812 stores the transmission address of the e-mail transmitted when the job is performed. Further, when the values of the "FTP", the "SMB", and the "WebDAB" are stored in the transmission job type 810, the file server and the file path of the transmission destination in a format corresponding to each protocol when the transmission job is performed are stored in the file server 813, and the file path 814. Furthermore, the history information stores a transmission result (OK or NG) and a transmission time in addition to the transmission address information described above.

Moreover, an operation application ID 815 is a region indicating an ID of an application (application for displaying the operation screen) operated by the user when the transmission job is input. According to this example, an application ID:AB-123-CDE for identifying the application displaying the "fax dedicated screen" is recorded.

Referring to a flowchart illustrated in FIG. 6, processing for performing the transmission using the transmission history selected by the user will be described.

FIG. 6 is a flowchart illustrating processing for reading the transmission history information from the job history region of the HDD 208 and setting the transmission address on the operation screen. The control program to realize the flowchart illustrated in FIG. 6 is stored in the HDD 208 and executed by the CPU 205.

The universal transmission screen on which all the transmission job types supported by the MFP 301 (however, only the fax transmission may be limited depending on the content of the setting value) can be operated and the fax dedicated screen, can be used.

<Processing for Receiving Request for Setting Address from History Screen>

When the history key 605 is pressed by a user, the CPU 205 displays the history screen (illustrated in FIG. 5A) on the operation unit 210. Further, the CPU 205 receives user's selection of the transmission history from the transmission history list 801. In step S401, when the CPU 205 detects that the address setting icon 802 is pressed, the processing proceeds to step S402. In step S402, the CPU 205 reads from the HDD 208 the history information corresponding to the transmission history received in step S401, and then in step S403, the CPU 205 reads information about the transmission job type 810.

<Processing for Determining Operation Screen for Transmitting Data>

Subsequently, the CPU 205 determines, with reference to the value of the transmission job type 810 read in step S403, whether the value indicates the fax. In other words, in step S404, it is determined whether the transmission type corresponding to the selected transmission history is the fax.

Further, when a plurality of pieces of history information is read from the HDD 208 in step S401 (i.e., when a plurality of pieces of transmission history is selected from the transmission history list 801 and the address setting icon 802 is pressed), if even one of the plurality of pieces of history information includes the transmission job type other than the fax, it is determined to be NO in step S404 (NO in step S404).

When the determination in step S404 is NO (NO in step S404), the transmission job type executed in the past includes the e-mail, the SMB, the FTP, the WebDAV, or the internet and fax. Therefore, the CPU 205 determines that the operation screen on which the address included in the transmission history is to be set is not the fax dedicated screen but the universal transmission screen.

Thus, the CPU 205 changes screen display on the operation unit 210 from the history screen to the universal transmission screen (i.e., FIG. 4A). The transmission job type 810 included in the history information read from the HDD 208 and the transmission address described in the fax address 811, the mail address 812, the file server 813, or the file path 814 corresponding to the transmission job type is automatically set on the universal transmission screen.

On the other hand, when the determination in step S404 is YES (YES in step S404), the transmission job type executed in the past is the fax. The processing proceeds to step S405, and then in step S405, the CPU 205 determines whether the setting value of "use fax dedicated screen" is valid with reference to the setting value stored in the HDD 208.

When the determination in step S405 is YES (YES in step S405), then in step S406, the CPU 205 displays the fax dedicated screen (FIG. 4B) for the operation unit 210 and the transmission address included in the history information read in step S402 is automatically set on the fax dedicated screen, and then the processing of the flowchart illustrated in FIG. 6 is ended.

When the transmission address is set on the operation screen illustrated in FIG. 4A or 4B and the start key 603 of the operation unit 210 is pressed, a document placed on the scanner 201 is scanned and the correction, the processing, and the edition are performed on the image data input by the scanner image processing unit 220. Subsequently, the data is transmitted via the network interface 211 or the public line 204.

As described above, according to the present exemplary embodiment, the screen shifts to the different operation screen depending on whether the transmission history selected from the transmission history list 801 is the fax transmission. Particularly, when the selected transmission history is the fax transmission (YES in step S404), according to the setting value of the MFP 301, it is determined whether the screen shifts to the fax dedicated screen or the universal transmission screen, which is a characteristic part of the present exemplary embodiment.

In other words, when the setting value of "use fax dedicated screen" of the MFP 301 is valid (YES in step S405), the fax dedicated screen not the universal transmission screen is determined as the screen for setting the transmission address. On the other hand, even when the transmission history selected from the transmission history list 801 indicates the transmission by the fax protocol (YES in step S404), if the setting value of "use operation screen of fax dedicated screen" of the MFP 301 is invalid (NO in step S405), the universal transmission screen is determined.

According to the present exemplary embodiment, the processing is described as selecting the history from the screen of the transmission history to set the address, however the processing for selecting the history from the screen of the reception history is similarly performed.

According to the first exemplary embodiment, when the operation screen is determined for setting the address from the transmission history, the transmission job type 810 stored as the transmission history and the setting values of the MFP 301 are referred to. On the other hand, according to a second exemplary embodiment, the application ID 815 for identifying the application operated by the user when the job of the transmission history is set is referred to. According to the second exemplary embodiment, the operation screen provided by the same application as the application that has been operated by the user in the past, can be used.

The application ID 815 is allocated for each operation screen displayed by the MFP 301. In other words, the application ID 815 serves as the ID for identifying the application and also the operation screen. The application ID 815 includes the transmission application additionally installed in the MFP 301.

According to the second exemplary embodiment, as the applications involved in data transmission, three applications are included. In other words, there are included a fax dedicated application invoked in response to the selection of the fax icon 608, an application invoked in response to the selection of the scan icon 607, and an application that is additionally installed in the MFP 301 and invoked in response to the selection of the secure fax icon 610.

According to the second exemplary embodiment, based on the application ID 815 identifying such applications, one operation screen is determined from among the three operation screens described above. The second exemplary embodiment is different from the first exemplary embodiment only in that the processing illustrated in FIG. 7 is performed in place of that in FIG. 6, and the only different point will be described below.

FIG. 7 is a flowchart illustrating processing performed by the MFP 301 when the history information is read from the job history region of the HDD 208 and set for the operation screen as the transmission address. The control program to realize the flowchart illustrated in FIG. 7 is stored in the HDD 208, and executed by the CPU 205.

First, when the history key 605 is pressed by a user, the CPU 205 displays the history screen (FIG. 5A) on the operation unit 210. Further, when the CPU 205 receives user's selection of the transmission history from the transmission history list 801, in step S501, the CPU 205 detects that the address setting icon 802 is pressed, and the processing proceeds to step S502. In step S502, the CPU 205 reads from the HDD 208 address information corresponding to the transmission history received in step S501, and then in step S503, the CPU 205 reads the information about the transmission job type 810 used for the transmission in the past.

Subsequently, in step S505, the CPU 205 determines whether the transmission job type 810 read in step S503 is the fax. When the determination in step S504 is NO (NO in step S504), the type of the transmission job executed in the past is the job type other than the fax. In other words, the job type is any of the e-mail transmission, the SMB transmission, the FTP transmission, the WebDAB transmission, and the internet and fax transmission.

Therefore, the operation screen on which the address included in the history information is to be set is determined to be the universal transmission screen on which all the transmission type can be performed. In other words, in step S509, the CPU 205 displays the universal transmission screen on the operation unit 210 and sets the address read in step S502 as the transmission address, and then the processing of the flowchart illustrated in FIG. 7 is ended.

On the other hand, when the determination in step S504 is YES (YES in step S504), the transmission job type performed in the past is the fax. In this case, the address corresponding to the selected transmission history can be set for both the fax dedicated screen and the universal transmission screen.

Further, the address can be set for a secure fax screen provided by the secure fax application. In step S505, the CPU 205 reads the application ID 815 corresponding to the transmission history information read from the HDD 208, and in step S507, with reference to the application ID 815 read in step S505, the address read in step S502 is set for the operation screen identified with the application ID 815.

For example, the operation screen on which the transmission processing corresponding to the selected history is performed is the "Secure Fax". The secure fax application is the Java (registered trademark) application that can collect the log of the fax transmissions and manage by whom, when, and how the image is transmitted as described above.

Thus, when the transmission job executed in the past is executed by executing the secure fax application, the secure fax screen needs to be displayed also when the address is selected from the history screen to set as the transmission address. Therefore, the CPU 205 displays the secure fax operation screen on the operation unit 210 and sets the address read in step S502 as the transmission address.

Further, according to the description above, the operation screen is determined based on the application ID only when the transmission job type is the fax, however, the operation screen may be determined based on the application ID also when the transmission job type is other than the fax.

As described above, according to the second exemplary embodiment, the application ID 815 is referred to for specifying the application operated by the user when the job is input. According to the second exemplary embodiment, the operation screen provided by the application same as the application that has been operated by the use in the past, can be used.

However, when the setting processing is performed in step S507, the setting value that is limited for the operation screen may be set for the MFP 301. For example, a case where the setting value of "use fax dedicated screen" described above is invalid. In such a case, since the address cannot be set on the fax dedicated screen, even though the application ID acquired in step S503 indicates the fax application (application to provide the fax dedicated screen), the address is set for the universal transmission screen.

Further, a case where the setting value of "display fax on universal transmission screen" is invalid is another example. In such a case, since the fax address cannot be set on the universal transmission screen, even if the application ID acquired in step S503 indicates the application providing the universal transmission screen, the address is set for the fax dedicated screen.

According to the second exemplary embodiment, the operation screen of the application same as that used when the job of the selected transmission history is performed can be used.

According to the first exemplary embodiment, with reference to the transmission job type stored as the transmission history and the set setting value, the operation screen is determined. Further, according to the second exemplary embodiment, with reference to the transmission job type and the application ID that are stored as the transmission history, the operation screen is determined.

On the other hand, according to a third exemplary embodiment, an embodiment will be described in which, with reference to information identifying the operation screen that has been displayed right before the history screen is displayed in addition to the history information stored as the transmission history, the operation screen to be transferred to is determined.

The operation screen shifted after the history screen is displayed is different from the operation screen that has been displayed before the history screen is displayed. The present exemplary embodiment can prevent the user from being embarrassed thereby.

According to the third exemplary embodiment, since only performing processing of a flowchart illustrated in FIG. 8 in place of that in FIG. 6 is different from the first exemplary embodiment, only this difference will be described.

The processing for specifying the address using the transmission history selected by the user according to the third exemplary embodiment will be described with reference to the flowchart illustrated in FIG. 8. The control program to realize the flowchart is stored in the HDD 208 and executed by the CPU 205.

In step S1001, first, the CPU 205 receives user's request for setting the address from the history, and then in step S1002, the CPU 205 reads the address information and the transmission job type corresponding to the transmission history received in step S1001.

Subsequently, in step S1003, with reference to the transmission job type read in step S1002, the CPU 205 determines whether the transmission job type of the selected transmission history is the fax.

When the determination in step S1003 is NO (NO in step S1003), the type of the transmission job executed in the past is other than the fax. Therefore, the operation screen on which the address included in the read history information is to be set is the universal transmission screen.

In step S1007, the CPU 205 displays the universal transmission screen on the operation unit 210 and sets the address read in step S1002 on the universal transmission screen, and then the processing is ended.

When the determination in step S1003 is YES (YES in step S1003), the type of the transmission job executed in the past is the fax. The processing proceeds to step S1004, and in step S1004, the CPU 205 acquires the identification information for identifying the operation screen that has been displayed before the history screen is displayed, and then in step S1005, the CPU 205 determines whether the screen that has been displayed before the history screen is displayed is the universal transmission screen.

When the determination in step S1005 is NO (NO in step S1005), it indicates that the user has selected the universal transmission screen as the screen for performing the transmission operation. Thus, it is appropriate to set on the universal transmission screen the address selected from the history screen. Then, the processing proceeds to step S1007, and the CPU 205 displays the universal transmission screen on the operation unit 210 and sets the address read in step S1002 on the universal transmission screen, and then the processing is ended.

On the other hand, when the determination in step S1005 is NO (NO in step S1005), it indicates that the user has selected the fax dedicated screen not the universal transmission screen as the operation screen for performing the transmission operation. In such a case, the fax dedicated screen is more appropriate than the universal transmission screen as the operation screen on which the address selected from the history screen is to be set. Even if the address is set for the universal transmission screen, the fax transmission can be performed.

However, when the operation screen shifts to the universal transmission screen, it shifts in order of the fax dedicated screen, the history screen, and then the universal transmission screen. In other words, the user may be confused by the operation screens that are different before and after the history screen is displayed.

In step S1006, the CPU 205 displays the fax dedicated screen on the operation unit 210 and sets the address read in step S1002 on the fax dedicated screen, and then the processing of the flowchart illustrated in FIG. 8 is ended.

As described above, according to the third exemplary embodiment, also with reference to the information about the operation screen that has been displayed right before the history screen is displayed in addition to the transmission history information stored as the transmission history, the operation screen to be shifted to is determined.

According to the third exemplary embodiment, when the operation screen to which the history screen is to shift is determined, the history information and the information about the operation screen that has been displayed right before the history screen is displayed are referred to. According to a fourth exemplary embodiment, in addition to such information, considering whether the transmission address has been already set on the operation screen that has been displayed right before the history screen is displayed, the operation screen to be shifted to is determined.

Figure 10:
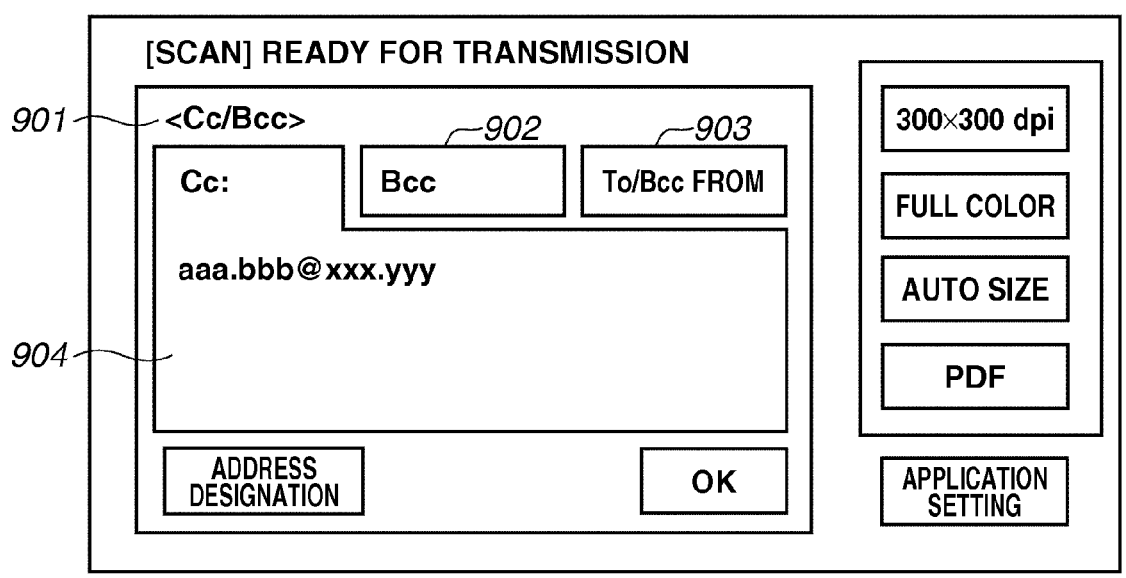
FIG. 10 illustrates an example of a Cc/Bcc input screen displayed on the operation unit.

Processing for performing the transmission using the history selected by the user according to the fourth exemplary embodiment will be described below with reference to a flowchart illustrated in FIG. 10. The control program for executing each step of the flowchart illustrated in FIG. 10 is stored in the HDD 208, and executed by the CPU 205.

Since the fourth exemplary embodiment is different from the first exemplary embodiment only in the processing of the flowchart illustrated in FIG. 9 in place of that in FIG. 6, only this difference will be described below.

Figure 9:
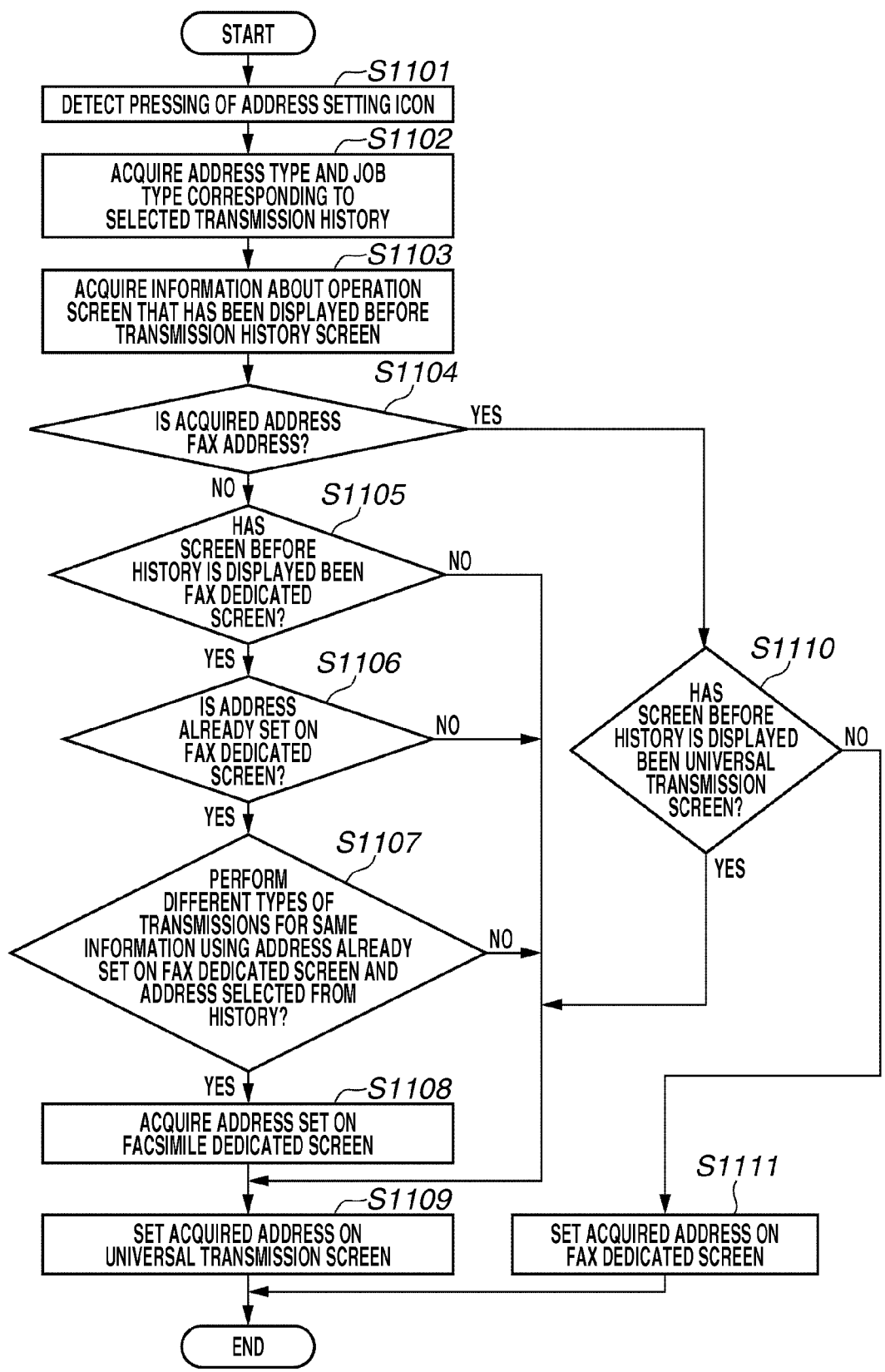
FIG. 9 is a flowchart illustrating processing for selecting a transmission history from a history screen and setting an address corresponding to the selected transmission history on an operation screen according to a fourth exemplary embodiment.

FIG. 9 is a flowchart illustrating a series of processing for reading the address information from the transmission history and setting the read address information on the operation screen as the transmission address according to the fourth exemplary embodiment.

In the flowchart illustrated in FIG. 9, the processing is started in response to the user's pressing of the history key 605, however, until the transmission of the data is actually started, when the history key 605 is pressed a plurality of times, the processing illustrated in FIG. 9 is started each time.

For example, after the history screen illustrated in FIG. 5A once shifts to the fax dedicated screen or the universal transmission screen, when the history key 605 is pressed again, this flowchart is performed at least two times.

Upon receiving the user's pressing of the history key 605, the CPU 205 displays the history screen (FIG. 5A) on the operation unit 210. Further, upon receiving the user's selection from among a plurality of the transmission histories displayed in the transmission history list 801, in step S1101, the CPU 205 detects that the address setting icon 802 is pressed.

In step S1102, the CPU 205 reads from the HDD 208 the information about the address corresponding to the transmission history received in step S1101 and the history information including the transmission job type. Subsequently, in step S1103, the CPU 205 acquires the identification information about the operation screen that has been displayed before the history screen is displayed.

In step S1104, with reference to the transmission job type included in the history information read in step S1102, the CPU 205 determines whether the transmission job type is the fax. When the determination is NO in step S1104 (NO in step S1104), the type of the transmission job executed in the past is other than the fax (i.e., network transmission).

Therefore, since the transmission address of the selected transmission history cannot be set on the fax dedicated screen, it is set on the universal transmission screen via which all the transmission protocol can be operated.

Before the history screen is displayed, the transmission address of the fax may have been already set on the fax dedicated screen. The different types of transmissions for the same information may need to be performed using the fax transmission address that has been already set and the address corresponding to the transmission history selected from the history screen.

However, when the transmission job type included in the history information read in step S1102 is other than the fax, since the address corresponding to the transmission history cannot be set on the fax dedicated screen, the operation screen needs to be shifted to the universal transmission screen to perform the setting.

Therefore, when the operation screen that has been displayed before the history screen is displayed is the fax dedicated screen (YES in step S1105), and also when the transmission address has been already set on the fax dedicated screen (YES in step S1006), the following processing is performed.

That is, in step S1107, the CPU 205 determines whether to perform the different types of transmissions for the same information using the address that has been already set for the fax dedicated screen and the address corresponding to the selected transmission history. This determination is made with reference to the setting value that has been previously determined by the MFP 301.

Alternatively, when the address setting icon 802 is pressed, whether to perform the different types of transmission for the same information may be inquired with the user. When the positive instruction is received as a response for the inquiry, it may be determined to be YES.

By performing the determination described above, a method of transmitting only the address of the transmission history as the transmission address and a method of performing the different types of transmissions for the same information with the address already set and the address of the above-described transmission history can be selectively performed.

When it is determined to be YES in step S1107 (YES in step S1107), in step S1108, the CPU 205 acquires the address that has been already set on the fax dedicated screen, and then in step S1108, the CPU 205 re-sets the address on the universal transmission screen. Subsequently, in step S1109, the address read in step S1102 is also set. On the other hand, when it is determined to be NO in step S1107 (NO in step S1107), the processing in step S1108 is skipped and the processing proceeds to step S1109. At this point, the setting of the address set on the fax dedicated screen may be cancelled.

On the other hand, when the determination in step S1105 is NO (NO in step S1105), or when the determination in step S1106 is NO (NO in step S1106), since the address to be transferred to the universal transmission screen does not exist, and thus the processing returns to step S1109.

In step S1109, the CPU 205 sets the address selected from the transmission history on the universal transmission screen. At this point, if the transmission address has been already set on the universal transmission screen, the address corresponding to the transmission history is newly set on the universal transmission screen in addition to the set address.

For example, on the universal transmission screen, the e-mail address registered to the address book has been selected and set as the transmission address. With this state, the history key 605 is pressed to display the history screen, and the transmission address of the SMB transmission is selected from the history screen, and then the address setting icon 802 is pressed. In such a case, in step S1109, the e-mail address and the folder path of the SMB transmission are set on the universal transmission screen. As described above, the different types of transmissions for the same information can be performed on the address selected from the transmission history and the address set by another method, which is a feature of the present exemplary embodiment.

When the determination in step S1104 is YES (YES in step S1104), the type of the transmission job executed in the past is the fax. In step S1110, with reference to the identification information about the operation screen that has been displayed before the history screen acquired in step S1103 is displayed, the CPU 205 determines whether the screen that has been displayed before the history screen is displayed is the universal transmission screen.

When the determination in step S1110 is NO (NO in step S1110), the CPU 205 displays the fax dedicated screen for the operation unit 210. Subsequently, in step S1111, the CPU 205 sets the address of the history information read in step S1102 on the fax dedicated screen, and then the processing of the flowchart illustrated in FIG. 9 is ended.

When the determination in step S1110 is YES (YES in step S1110), the user selects the universal transmission screen as the operation screen for performing the transmission operation, and then, after the processing in step S1108 is performed, the processing of the flowchart is ended.

According to the fourth exemplary embodiment, the different types of transmissions for the same information can be performed including the fax transmission address that has been already set on the fax dedicated screen and the address other than the fax corresponding to the transmission history selected from the history screen.

When the address selected from the history screen is set on the operation screen, operations that determine the optimum operation screen of the universal transmission screen, the fax dedicated screen, and the secure fax operation screen have been described above.

In a fifth exemplary embodiment, focusing only on the universal transmission screen, an operation for determining the further detailed operation screen in the universal transmission screen will be described.

FIG. 10 illustrates an example of a Cc input screen in the universal transmission screen. FIG. 10 illustrates a Cc input screen 901, an address list 904 indicating the address to which the Cc transmission is instructed, a button 902 for invoking a Bcc address designation screen, and a button 903 for re-setting on the Cc input screen the transmission address set on the screen illustrated in FIG. 4A or a Bcc input screen (not illustrated).

The universal transmission screen can deal with all transmission job types that can be executed by the MFP 301, for example, the e-mail transmission, the SMB transmission, the FTP transmission, the WebDAV transmission, the internet and fax transmission, and the fax transmission.

However, among the transmissions described above, the transmission job type for which the transmission address can be set as the Cc address and the Bcc address is only the e-mail transmission. When the transmission job other than the e-mail transmission is performed, the screen illustrated in FIG. 4A needs to be set not the Cc input screen illustrated in FIG. 10.

Therefore, when the address is selected from the history screen to be set on the operation screen, it needs to be appropriately determined whether to set the address on the screen illustrated in FIG. 4A or the screen illustrated in FIG. 10.

FIG. 11 is a flowchart illustrating a series of processing, in a state where the operation is being performed on the universal transmission screen, for reading the history information from the history screen and setting the history information as the transmission address on the screen according to a fifth exemplary embodiment.

First, in step S1201, the CPU 205 receives user's request for setting the address via the history screen, in step S1202, reads the address information from the transmission history received in step S1201, and then in step S1203, reads the transmission job type.

Subsequently, in step S1204, the CPU 205 acquires the identification information about the operation screen that has been displayed before the history screen is displayed. When the operation screen identified by the acquired identification information is the universal transmission screen, then in step S1205, the CPU 205 determines whether the screen that has displayed before the history screen is displayed is the Cc input screen or the Bcc input screen as illustrated in FIG. 10.

When it is determined in step S1205 that neither of the Cc input screen nor the Bcc input screen has been displayed before the history screen is displayed, it is determined that the normal address input operation is being performed. In step S1209, the CPU 205 sets the address information read in step S1202 on the universal transmission screen illustrated in FIG. 4A, and the processing is ended. When the e-mail address is set on the universal transmission screen illustrated in FIG. 4A, the address is set as a To address.

On the other hand, in step S1205, when it is determined that the screen that has been displayed before the history screen is displayed is the Cc input screen or the Bcc input screen, then in step S1206, the CPU 205 determines whether the transmission job type acquired in step S1203 is the e-mail transmission.

When the determination in step S1206 is YES (YES in step S1206), in other words, when the transmission job type is the e-mail transmission, the address acquired from the transmission history can be set on any of the To address, the Cc address, and the Bcc address. In step S1207, the CPU 205 sets the address read in step S1202 on either of the Cc input screen and the Bcc input screen specified in step S1204, and then the processing of the flowchart illustrated in FIG. 11 is ended.

When the determination in step S1206 is NO (NO in step S1206), the type of the transmission job executed in the past is other than the e-mail transmission. In this case, the acquired address cannot be set on the screen as the Cc address or the Bcc address. In step S1208, the CPU 205 sets the address information read in step S1202 on the universal transmission screen illustrated in FIG. 4A. At this point, the address that has been already set on the operation screen identified by the identification information acquired in step S1204 may be also acquired and re-set on the universal transmission screen illustrated in FIG. 4A.

According to the fifth exemplary embodiment, when the operation screen that has been displayed right before the history screen is displayed is the Cc screen or the Bcc screen on the universal transmission screen, and also when the address corresponding to the acquired transmission history is the e-mail address, the address is set on the Cc screen or the Bcc screen not the base screen. Therefore, the address can be set on the more appropriate screen.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-025335 filed Feb. 8, 2012, which is hereby incorporated by reference herein in its entirety.

What is claimed is:

1. A data transmission apparatus comprising:
   an input unit configured to input data;
   an operation screen display unit configured to display a fax screen for performing fax transmission and a transmission screen for performing the fax transmission and a network transmission;
   a history display unit configured to display a history of transmissions performed in the past;
   an acquisition unit configured to acquire an address and a transmission type corresponding to a history selected from the history;
   a setting unit configured to, when the transmission type is fax and when use of the fax screen is limited, set the address acquired by the acquisition unit on the transmission screen, and when the transmission type is the fax and when the use of the fax screen is not limited, to set the address acquired by the acquisition on the fax screen; and
   a fax transmission unit configured to transmit the data input to the address set by the setting unit via a public line.

2. The data transmission apparatus according to claim 1, wherein, when the transmission type is the network transmission, the setting unit is configured to set the address acquired by the acquisition unit on the transmission screen.

3. The data transmission apparatus according to claim 1, further comprising a network transmission unit configured to transmit the data input by the input unit via a network.

4. The data transmission apparatus according to claim 1,
   wherein the acquisition unit is configured to further acquire, of a plurality of IDs for identifying operation screens, an ID corresponding to the selected transmission history; and
   wherein the setting unit configured to, when the transmission type is the fax and when the use of the fax screen is not limited, set an address corresponding to the selected transmission history on the operation screen identified by the ID acquired by the acquisition unit.

5. The data transmission apparatus according to claim 1,
   wherein the acquisition unit is configured to further acquire, of a plurality of IDs for identifying the operation screens, an ID for identifying the operation screen that has been displayed before the history display unit displays a list of the transmission history; and
   wherein the setting unit is configured to, when the transmission type is the fax and when the use of the fax screen is not limited, set an address corresponding to the selected transmission history on the operation screen identified by the ID acquired by the acquisition unit.

6. The data transmission apparatus according to claim 5,
   wherein the acquisition unit is configured to, when the operation screen that has been displayed before the history display unit displays the transmission history is the fax screen, further acquire a fax address that has been already set on the fax screen; and
   wherein, when at least an address for performing network transmission is included in the addresses acquired by the acquisition unit, the acquired address is set on the transmission screen.

7. A control method for a data transmission apparatus comprising:
   inputting data;
   displaying a fax screen for performing a fax transmission;
   displaying a transmission screen for performing the fax transmission and a network transmission;
   displaying history of transmissions performed in the past;
   acquiring an address and a transmission type corresponding to a history selected from the history;
   setting, when the transmission type is fax and when use of the fax screen is limited, the acquired address on the transmission screen, and setting when the transmission type is the fax and when the use of the fax screen is not limited, the acquired address corresponding to the selected history on the fax screen; and
   fax-transmitting the input data to the set address via a public line.

8. A non-transitory computer readable storage medium storing a program for causing a computer to execute:
   inputting data;
   displaying a fax screen for performing a fax transmission;
   displaying a transmission screen for performing the fax transmission and a network transmission;
   displaying history of transmissions performed in the past;
   acquiring an address and a transmission type corresponding to a history selected from the history;
   setting, when the transmission type is fax and when use of the fax screen is limited, acquired the address on the transmission screen, and setting when the transmission type is the fax and when the use of the fax screen is not limited, an address corresponding to the selected history on the fax screen; and fax-transmitting the input data to the set address via a public line.

\* \* \* \* \*